US012600093B2

(12) United States Patent
Ishikura

(10) Patent No.: US 12,600,093 B2
(45) Date of Patent: Apr. 14, 2026

(54) INFORMATION PROCESSING DEVICE

(71) Applicant: SEIKO EPSON CORPORATION, Tokyo (JP)

(72) Inventor: Keigo Ishikura, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 322 days.

(21) Appl. No.: 18/340,987

(22) Filed: Jun. 26, 2023

(65) Prior Publication Data

US 2023/0415421 A1     Dec. 28, 2023

(30) Foreign Application Priority Data

Jun. 27, 2022     (JP) ................................. 2022-102488

(51) Int. Cl.
| | |
|---|---|
| *B29C 64/393* | (2017.01) |
| *B29C 64/40* | (2017.01) |
| *B33Y 40/20* | (2020.01) |
| *B33Y 50/02* | (2015.01) |
| *H04N 1/00* | (2006.01) |
| *B33Y 10/00* | (2015.01) |
| *B33Y 50/00* | (2015.01) |

(52) U.S. Cl.
CPC ............ *B29C 64/393* (2017.08); *B29C 64/40* (2017.08); *B33Y 40/20* (2020.01); *B33Y 50/02* (2014.12); *H04N 1/0044* (2013.01)

(58) Field of Classification Search
CPC ..... B29C 64/393; B29C 64/40; B29C 64/386; B33Y 40/20; B33Y 50/02; B33Y 50/00; B33Y 10/00; H04N 1/0044

USPC .......................................................... 700/118
See application file for complete search history.

(56) References Cited

U.S. PATENT DOCUMENTS

| | | | |
|---|---|---|---|
| 2015/0309494 A1 | 10/2015 | Kobayashi et al. | |
| 2016/0274572 A1* | 9/2016 | Littrell ................... | G06F 30/00 |
| 2017/0014903 A1 | 1/2017 | Sugiura | |
| 2018/0079141 A1 | 3/2018 | Yoshida et al. | |
| 2022/0297385 A1* | 9/2022 | Tanaka ................... | B33Y 50/00 |

FOREIGN PATENT DOCUMENTS

| | | | |
|---|---|---|---|
| JP | 2015-208957 A | 11/2015 | |
| JP | 6077717 B1 | 2/2017 | |
| JP | 2018-047623 A | 3/2018 | |

* cited by examiner

*Primary Examiner* — Michael J Brown
(74) *Attorney, Agent, or Firm* — Harness, Dickey & Pierce, P.L.C.

(57) ABSTRACT

An information processing device includes: a first processing unit configured to generate, according to a predetermined condition, a support structure for supporting a shaped object shaped by a three-dimensional shaping device; a display control unit configured to display, on a screen, a shape of the shaped object and a shape of the support structure generated by the first processing unit; a reception unit configured to receive removal information indicating a region to be removed from the support structure generated by the first processing unit; and a second processing unit configured to generate, based on the support structure generated by the first processing unit and the removal information received by the reception unit, support data for shaping the support structure by the three-dimensional shaping device.

7 Claims, 13 Drawing Sheets

SHAPING DATA GENERATION PROCESSING

ACQUIRE SHAPE DATA — S10

GENERATE SUPPORT STRUCTURE — S20

DISPLAY SHAPED OBJECT AND SUPPORT STRUCTURE — S30

RECEIVE REMOVAL INFORMATION — S40

DISPLAY REMOVAL INFORMATION — S50

GENERATE SHAPING DATA — S60

END

FIG. 10

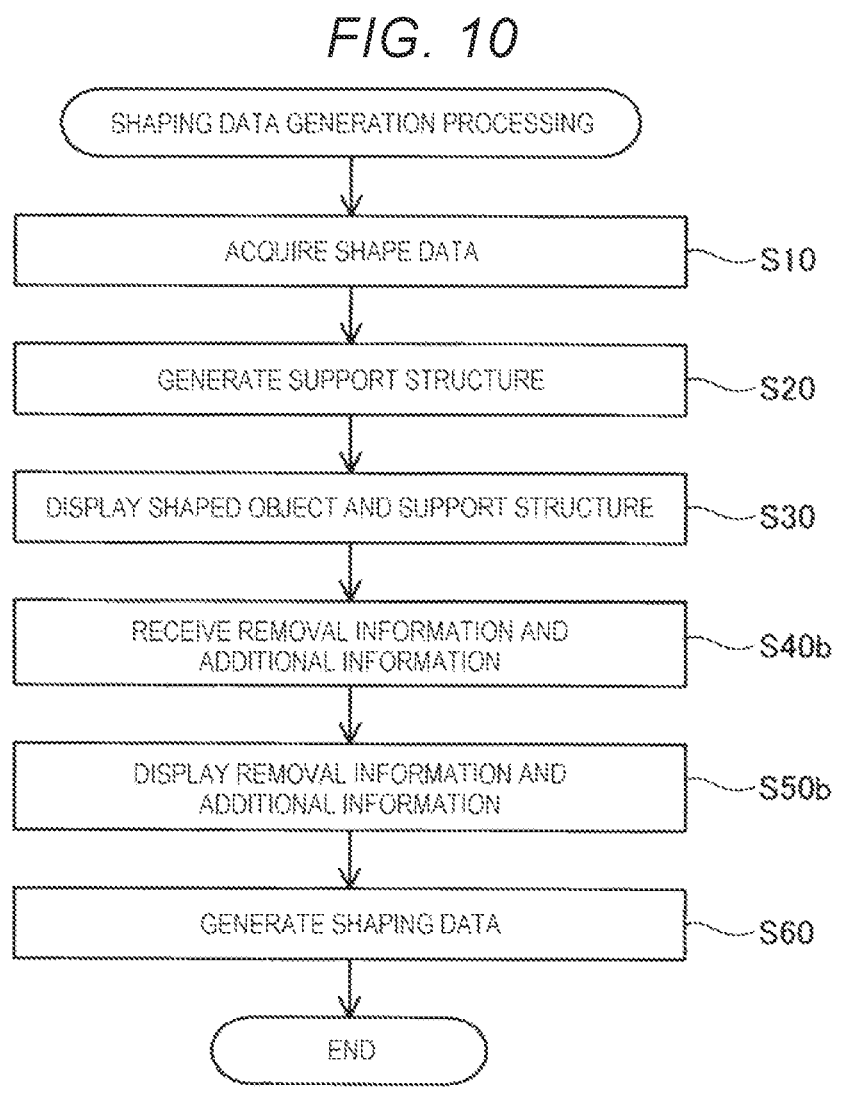

```
    ┌──────────────────────────────────────────┐
    │   SHAPING DATA GENERATION PROCESSING       │
    └──────────────────────────────────────────┘
                        │
                        ▼
    ┌──────────────────────────────────────────┐
    │           ACQUIRE SHAPE DATA               │── S10
    └──────────────────────────────────────────┘
                        │
                        ▼
    ┌──────────────────────────────────────────┐
    │        GENERATE SUPPORT STRUCTURE          │── S20
    └──────────────────────────────────────────┘
                        │
                        ▼
    ┌──────────────────────────────────────────┐
    │  DISPLAY SHAPED OBJECT AND SUPPORT STRUCTURE│── S30
    └──────────────────────────────────────────┘
                        │
                        ▼
    ┌──────────────────────────────────────────┐
    │      RECEIVE REMOVAL INFORMATION AND       │── S40b
    │           ADDITIONAL INFORMATION           │
    └──────────────────────────────────────────┘
                        │
                        ▼
    ┌──────────────────────────────────────────┐
    │      DISPLAY REMOVAL INFORMATION AND       │── S50b
    │           ADDITIONAL INFORMATION           │
    └──────────────────────────────────────────┘
                        │
                        ▼
    ┌──────────────────────────────────────────┐
    │           GENERATE SHAPING DATA            │── S60
    └──────────────────────────────────────────┘
                        │
                        ▼
                  ┌───────────┐
                  │    END     │
                  └───────────┘
```

INFORMATION PROCESSING DEVICE

The present application is based on, and claims priority from JP Application Serial Number 2022-102488, filed Jun. 27, 2022, the disclosure of which is hereby incorporated by reference herein in its entirety.

BACKGROUND

1. Technical Field

The present disclosure relates to an information processing device.

2. Related Art

JP-A-2018-47623 discloses a technique for automatically setting a support of a shaped object molded by a 3D printer at an optimum position.

The above technique is convenient because a molding position of the support can be automatically set. However, when the support is disposed at an unnecessary position, shaping accuracy may be reduced.

SUMMARY

According to a first aspect of the present disclosure, an information processing device is provided. The information processing device includes: a first processing unit configured to generate, according to a predetermined condition, a support structure for supporting a shaped object shaped by a three-dimensional shaping device; a display control unit configured to display, on a screen, a shape of the shaped object and a shape of the support structure generated by the first processing unit; a reception unit configured to receive removal information indicating a region to be removed from the support structure generated by the first processing unit; and a second processing unit configured to generate, based on the support structure generated by the first processing unit and the removal information received by the reception unit, support data for shaping the support structure by the three-dimensional shaping device.

BRIEF DESCRIPTION OF THE DRAWINGS

FIG. 10 is a flowchart of shaping data generation processing according to a second embodiment.

DESCRIPTION OF EXEMPLARY EMBODIMENTS

A. First Embodiment

Figure 1:
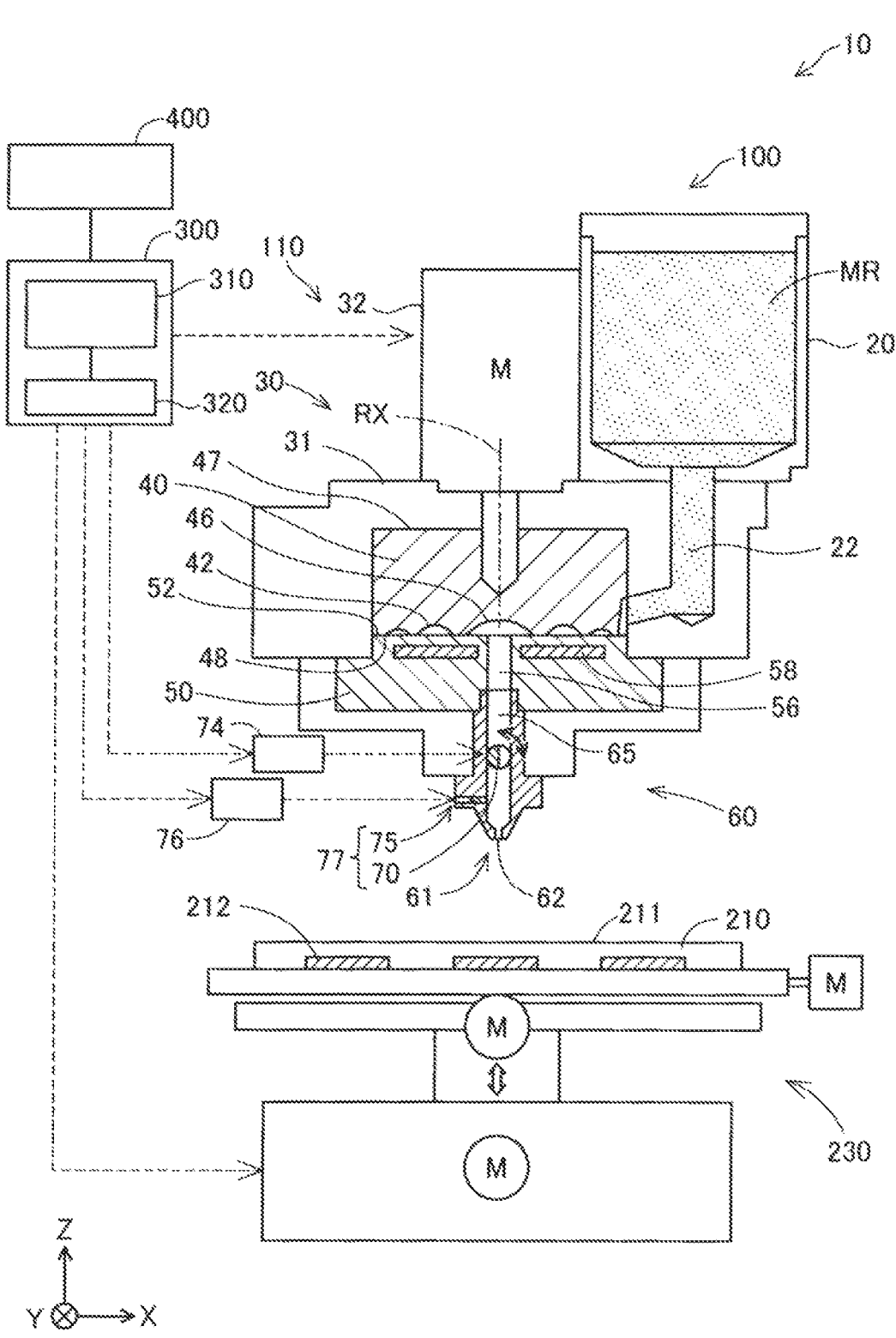
FIG. 1 is a diagram showing a schematic configuration of a three-dimensional shaping system.

FIG. 1 is a diagram showing a schematic configuration of a three-dimensional shaping system 10 according to a first embodiment. In FIG. 1, arrows indicating X, Y, and Z directions orthogonal to one another are shown. The X direction and the Y direction are directions parallel to a horizontal plane, and the Z direction is a direction along a vertically upward direction. The arrows indicating the X, Y, and Z directions are also appropriately shown in other drawings such that the shown directions correspond to those in FIG. 1. In the following description, when orientation of a direction is specified, a direction indicated by an arrow in each drawing is referred to as "+", a direction opposite thereto is referred to as "–", and a positive or negative sign is used in combination with a direction notation. Hereinafter, a +Z direction is referred to as "upper", and a –Z direction is referred to as "lower".

The three-dimensional shaping system 10 includes a three-dimensional shaping device 100 and an information processing device 400. The three-dimensional shaping device 100 according to the embodiment is a device which shapes a shaped object by a material extrusion method. The three-dimensional shaping device 100 includes a control unit 300 for controlling each part of the three-dimensional shaping device 100. The control unit 300 and the information processing device 400 are communicably connected to each other.

The three-dimensional shaping device 100 includes a shaping part 110 for generating and discharging a shaping material, a shaping stage 210 serving as a base of a shaped object, and a movement mechanism 230 for controlling a discharge position of the shaping material.

The shaping part 110 discharges, under control of the control unit 300, the shaping material obtained by plasticizing a material in a solid state onto the stage 210. The shaping part 110 includes a material supply portion 20 as a supply source of a raw material before being converted into the shaping material, a plasticizing portion 30 for converting the raw material into the shaping material, and a discharge portion 60 for discharging the shaping material.

The material supply portion 20 supplies a raw material MR to the plasticizing portion 30. The material supply portion 20 is implemented by, for example, a hopper which accommodates the raw material MR. The material supply portion 20 is coupled, via a communication path 22, to the plasticizing portion 30. The raw material MR is charged into the material supply portion 20 in the form of pellets, powder, or the like. In the embodiment, a pellet-shaped ABS resin material is used.

The plasticizing portion 30 plasticizes the raw material MR supplied from the material supply portion 20 to generate a shaping material in a paste form exhibiting fluidity, and guides the shaping material to the discharge portion 60. In the embodiment, "plasticizing" is a concept including melting, and is to change from a solid state to a fluid state.

Specifically, for a material in which glass transition occurs, plasticizing is to raise a temperature of a material to be equal to or higher than a glass transition point. For a material in which glass transition does not occur, plasticizing is to raise the temperature of the material to be equal to or higher than a melting point.

The plasticizing portion 30 includes a screw case 31, a drive motor 32, a flat screw 40, and a barrel 50. The flat screw 40 is also referred to as a rotor or a scroll. The barrel 50 is also referred to as a screw facing portion.

Figures 2, 3:
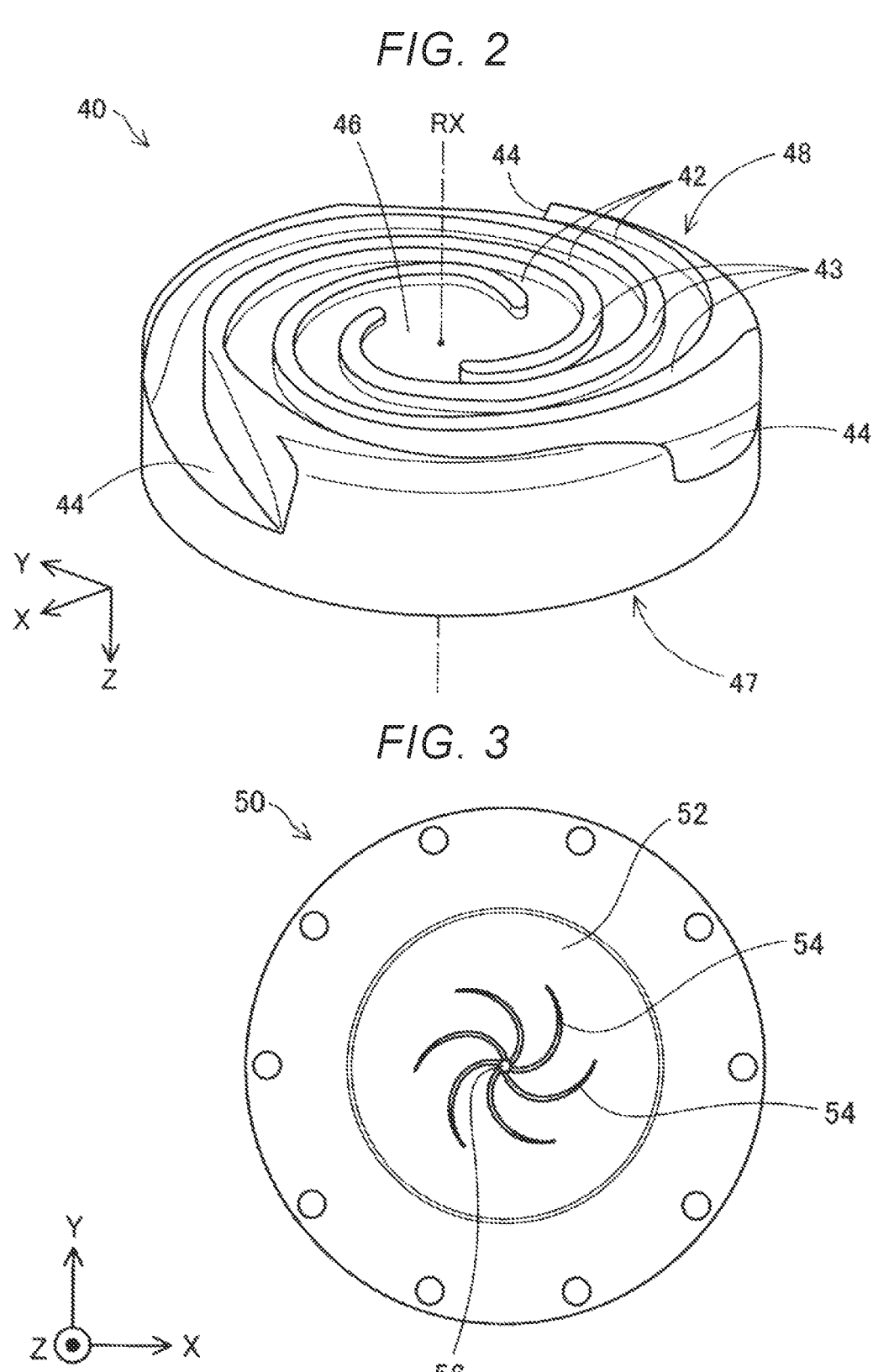
FIG. 2 is a perspective view showing a schematic configuration of a flat screw.
FIG. 3 is a schematic plan view of a barrel.

FIG. 2 is a perspective view showing a schematic configuration of a lower surface 48 side of the flat screw 40. In order to facilitate understanding of the technique, the flat screw 40 shown in FIG. 2 is shown in a state where a positional relationship between an upper surface 47 and a lower surface 48 shown in FIG. 1 is reversed in a vertical direction. FIG. 3 is a schematic plan view showing an upper surface 52 side of the barrel 50. The flat screw 40 has a substantially columnar shape in which a length in an axial direction, which is a direction along a central axis of the flat screw 40, is smaller than a length in a direction perpendicular to the axial direction. The flat screw 40 is disposed such that a rotation axis RX serving as a rotation center of the flat screw 40 is parallel to the Z direction.

As shown in FIG. 1, the flat screw 40 is housed in the screw case 31. The upper surface 47 of the flat screw 40 is coupled to the drive motor 32, and the flat screw 40 rotates in the screw case 31 by a rotational drive force generated by the drive motor 32. The drive motor 32 is driven under control of the control unit 300. The flat screw 40 may be driven by the drive motor 32 via a speed reducer.

As shown in FIG. 2, spiral grooves 42 are formed in the lower surface 48 of the flat screw 40, which is a surface intersecting the rotation axis RX. The communication path 22 of the material supply portion 20 described above communicates with the grooves 42 from a side surface of the flat screw 40. In the embodiment, three grooves 42 are formed by being separated by ridge portions 43. The number of grooves 42 is not limited to three, and may be one or two or more. The grooves 42 are not limited to a spiral shape, and may have a helical shape or an involute curve shape, or may have a shape extending in an arc from a central portion toward an outer circumference.

The lower surface 48 of the flat screw 40 faces an upper surface 52 of the barrel 50, and a space is formed between the grooves 42 of the lower surface 48 of the flat screw 40 and the upper surface 52 of the barrel 50. The raw material MR is supplied from the material supply portion through a material inlet 44 shown in FIG. 2 to the space between the flat screw 40 and the barrel 50.

As shown in FIG. 1, a barrel heater 58 for heating the raw material MR supplied into the grooves 42 of the rotating flat screw 40 is embedded in the barrel 50. A communication hole 56 is provided at a center of the barrel 50. As shown in FIG. 3, a plurality of guide grooves 54 which are coupled to the communication hole 56 and extend spirally from communication hole 56 toward an outer circumference are formed in the upper surface 52 of the barrel 50. One ends of the guide grooves 54 may not be coupled to the communication hole 56. The guide grooves 54 may be omitted.

The raw material MR supplied into the grooves 42 of the flat screw 40 flows along the grooves 42 by rotation of the flat screw 40 while being plasticized in the grooves 42, and is guided to a central portion 46 of the flat screw as a shaping material. The shaping material in a paste form exhibiting fluidity flowing into the central portion 46 is supplied, through the communication hole 56 provided at the center of the barrel 50, to the discharge portion 60. In the shaping material, not all kinds of substances constituting the shaping material may be melted. The shaping material may be converted into a fluid state as a whole by melting at least a part of kinds of substances among all substances constituting the shaping material.

The discharge portion 60 in FIG. 1 includes a nozzle 61 for discharging the shaping material, a flow path for the shaping material provided between the flat screw and a nozzle opening 62, and a discharge control unit 77 for controlling discharge of the shaping material.

The nozzle 61 is coupled, through the flow path to the communication hole 56 of the barrel 50. The nozzle 61 discharges the shaping material generated in the plasticizing portion 30 from the nozzle opening 62 at a tip toward the stage 210.

The discharge control unit 77 includes a discharge adjustment portion 70 for opening and closing the flow path 65, and a suction portion 75 for sucking and temporarily storing the shaping material.

The discharge adjustment portion 70 is provided in the flow path 65, and changes an opening degree of the flow path 65 by rotating in the flow path 65. In the embodiment, the discharge adjustment portion 70 is implemented by a butterfly valve. The discharge adjustment portion 70 is driven by a first drive unit 74 under control of the control unit 300. The first drive unit 74 is implemented by, for example, a stepping motor. The control unit 300 can adjust, by controlling a rotation angle of the butterfly valve using the first drive unit 74, a flow rate of the shaping material flowing from the plasticizing portion 30 to the nozzle 61, that is, a discharge amount of the shaping material discharged from the nozzle 61. The discharge adjustment portion 70 can adjust the discharge amount of the shaping material and can control ON/OFF of outflow of the shaping material.

The suction portion 75 is coupled between the discharge adjustment portion 70 in the flow path 65 and the nozzle opening 62. The suction portion 75 temporarily sucks the shaping material in the flow path 65 when the discharge of the shaping material from the nozzle 61 is stopped, thereby preventing a tailing phenomenon in which the shaping material drips from the nozzle opening 62 like a thread. In the embodiment, the suction portion 75 is implemented by a plunger. The suction portion 75 is driven by a second drive unit 76 under control of the control unit 300. The second drive unit 76 is implemented by, for example, a stepping motor, or a rack-and-pinion mechanism which converts a rotational force of a stepping motor into a translational motion of the plunger.

The stage 210 is disposed at a position facing the nozzle opening 62 of the nozzle 61. In the first embodiment, a shaping surface 211 of the stage 210 facing the nozzle opening 62 of the nozzle 61 is parallel to the X and Y directions, that is, a horizontal direction. The stage 210 is provided with a stage heater 212 for preventing rapid cooling of the shaping material discharged onto the stage 210. The stage heater 212 is controlled by the control unit 300.

The movement mechanism 230 changes a relative position between the stage 210 and the nozzle 61 under control of the control unit 300. In the embodiment, a position of the nozzle 61 is fixed, and the movement mechanism 230 moves the stage 210. The movement mechanism 230 is implemented by a three-axis positioner which moves the stage 210 in the three-axis directions of the X, Y, and Z directions by drive forces of three motors. In the specification, unless otherwise specified, a movement of the nozzle 61 means moving the nozzle 61 or the discharge portion 60 relative to the stage 210.

In another embodiment, instead of the configuration in which the stage 210 is moved by the movement mechanism 230, a configuration in which the movement mechanism 230 moves the nozzle 61 relative to the stage 210 in a state where a position of the stage 210 is fixed may be adopted. A configuration in which the movement mechanism 230 moves the stage 210 in the Z direction and moves the nozzle 61 in the X and Y directions, or a configuration in which the movement mechanism 230 moves the stage 210 in the X and Y directions and moves the nozzle 61 in the Z direction may be adopted. With these configurations, a relative positional relationship between the nozzle 61 and the stage 210 can be changed.

The control unit 300 is a control device which controls overall operations of the three-dimensional shaping device 100. The control unit 300 is implemented by a computer including one or a plurality of processors 310, a storage device 320 including a main storage device and an auxiliary storage device, and an input and output interface for receiving a signal from the outside and outputting a signal to the outside. By executing a program stored in the storage device 320, the processor 310 controls the shaping part 110 and the movement mechanism 230 according to shaping data acquired from the information processing device 400 to shape a shaped object on the stage 210. Instead of being implemented by the computer, the control unit 300 may be implemented by a configuration in which circuits are combined.

Figure 4:
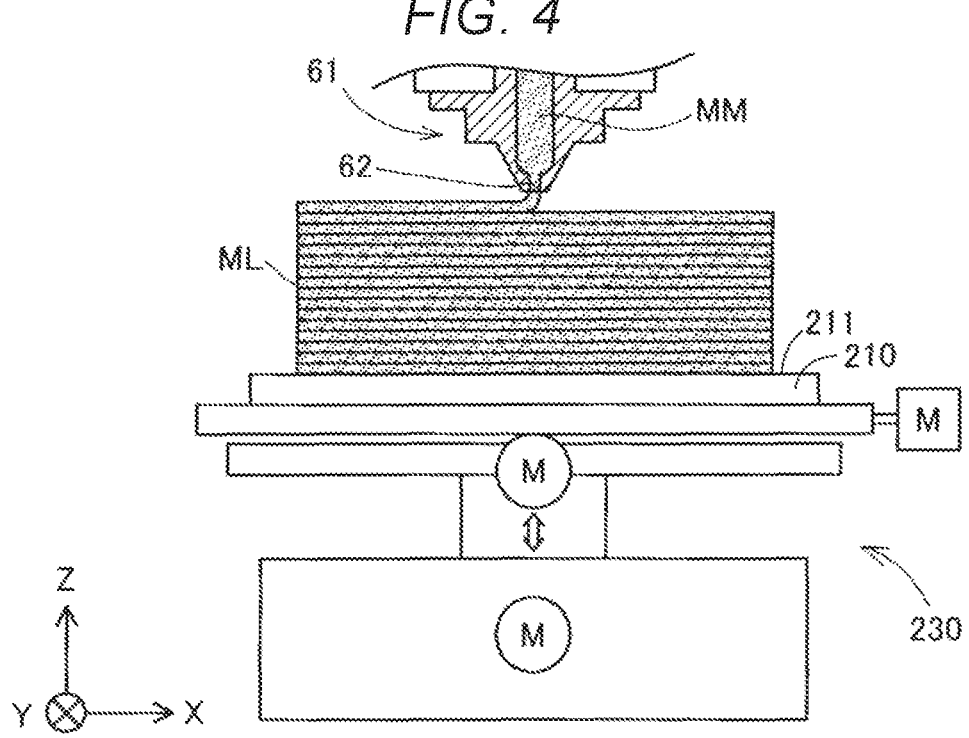
FIG. 4 is a diagram schematically showing a state of shaping a shaped object.

FIG. 4 is a diagram schematically showing a state where the three-dimensional shaping device 100 shapes a shaped object. In the three-dimensional shaping device 100, as described above, the raw material MR in a solid state is plasticized to generate a shaping material MM. The control unit 300 causes the nozzle 61 to discharge the shaping material MM while maintaining a distance between the shaping surface 211 of the stage 210 and the nozzle 61 and changing the position of the nozzle 61 relative to the stage 210 in a direction along the shaping surface 211 of the stage 210. The shaping material MM discharged from the nozzle 61 is continuously deposited in a movement direction of the nozzle 61.

The control unit 300 repeats movement of the nozzle 61 to form layers ML. After one layer ML is formed, the control unit 300 relatively moves the position of the nozzle 61 relative to the stage 210 in the Z direction. A layer ML is further stacked on layers ML formed so far to shape a shaped object.

For example, the control unit 300 may temporarily interrupt movement of the nozzle 61 in the Z direction when the layer ML corresponding to one layer is completed, or interrupt the discharge of the shaping material from the nozzle 61 when there are a plurality of independent shaping regions in each layer. In this case, the flow path 65 is closed by the discharge adjustment portion 70, the discharge of the shaping material MM from the nozzle opening 62 is stopped, and the shaping material in the nozzle 61 is temporarily sucked by the suction portion 75. After changing the position of the nozzle 61, the control unit 300 causes the discharge adjustment portion 70 to open the flow path 65 while discharging the shaping material in the suction portion 75, thereby resuming deposition of the shaping material MM from the changed position of the nozzle 61.

Figure 5:
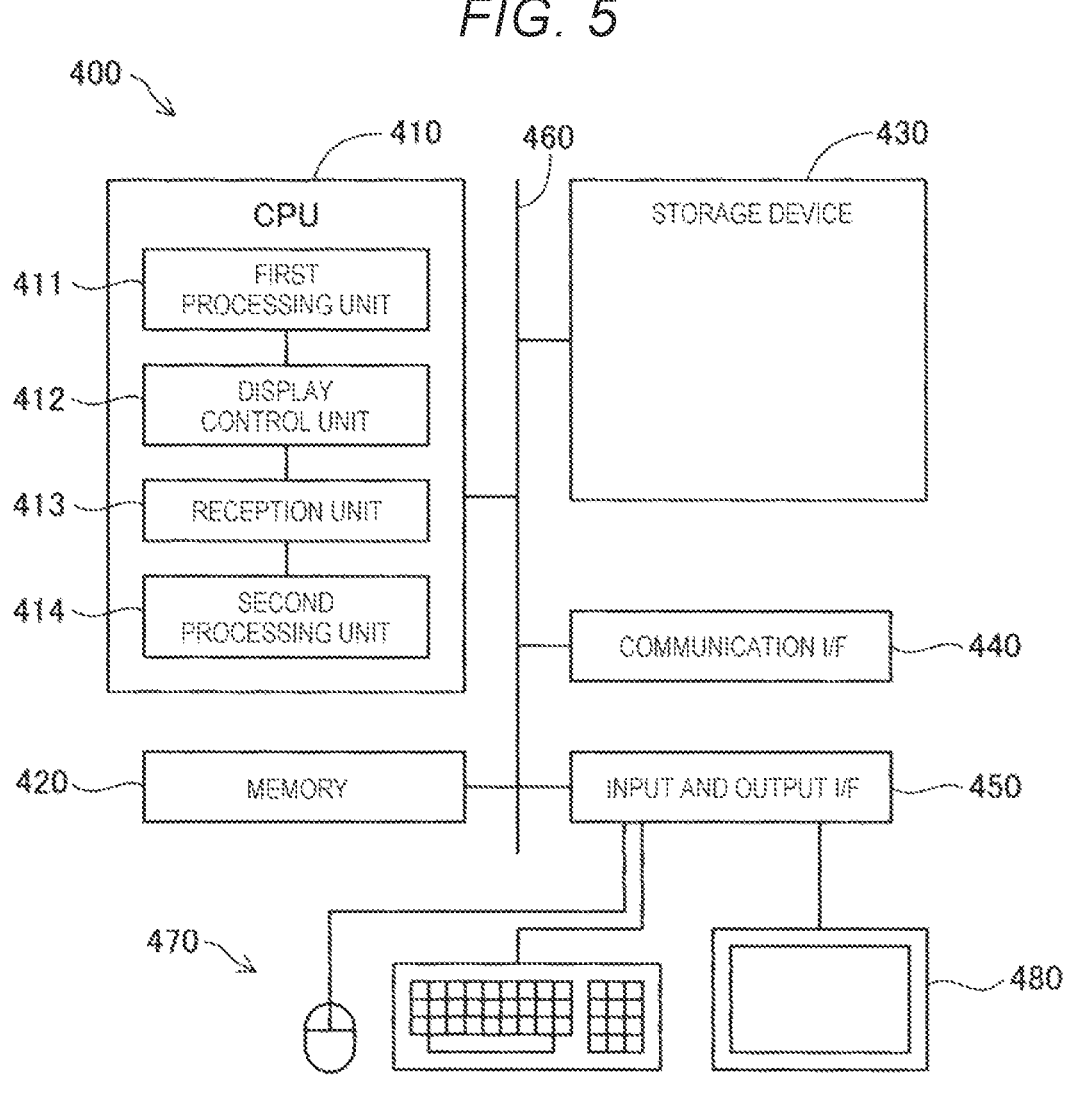
FIG. 5 is a diagram showing a schematic configuration of an information processing device.

FIG. 5 is a diagram showing a schematic configuration of the information processing device 400. The information processing device 400 is implemented as a computer in which a CPU 410, a memory 420, a storage device 430, a communication interface 440, and an input and output interface 450 are coupled to one another by a bus 460. An input device 470 such as a keyboard and a mouse and a display device 480 such as a liquid crystal display are coupled to the input and output interface 450. The information processing device 400 is coupled, via the communication interface 440, to the control unit 300 of the three-dimensional shaping device 100.

The CPU 410 functions as a first processing unit 411, a display control unit 412, a reception unit 413, and a second processing unit 414 by executing a program stored in the storage device 430.

The first processing unit 411 generates, according to a predetermined condition, a support structure for supporting a shaped object shaped by the three-dimensional shaping device 100.

The display control unit 412 displays, on a screen of the display device 480, a shape of the shaped object and a shape of the support structure generated by the first processing unit 411.

The reception unit 413 receives removal information indicating a region to be removed from the support structure generated by the first processing unit 411.

The second processing unit 414 generates, based on the support structure generated by the first processing unit 411 and the removal information received by the reception unit 413, support data for shaping the support structure by the three-dimensional shaping device 100.

The information processing device 400 transmits, to the control unit 300 of the three-dimensional shaping device 100, shaping data including main body data for shaping a main body of the shaped object and support data for shaping the support structure. The control unit 300 controls the discharge portion 60 and the movement mechanism 230 according to the received shaping data to shape, on the stage 210, the shaped object and the support structure for supporting the shaped object.

Figure 6:
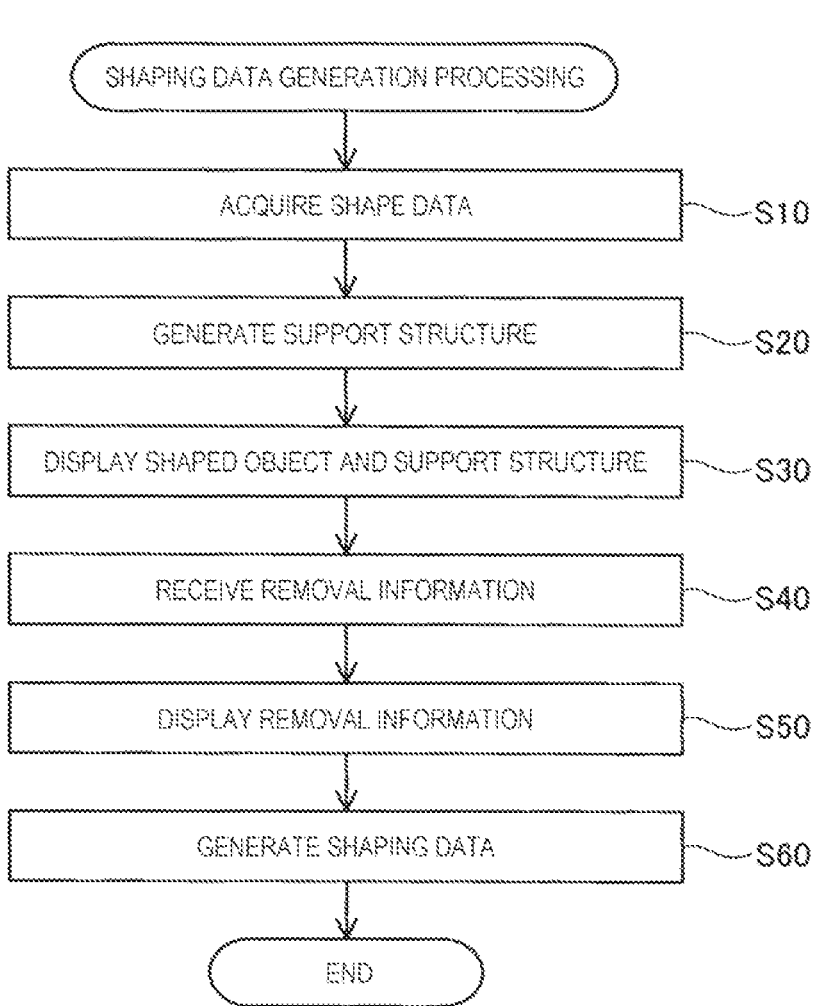
FIG. 6 is a flowchart of shaping data generation processing.

FIG. 6 is a flowchart of shaping data generation processing executed by the information processing device 400.

In step S10, the first processing unit 411 of the information processing device 400 acquires shape data representing a three-dimensional shape of the shaped object from another computer, a recording medium, or the storage device 430. The shape data is data representing a shape of a three-dimensional shaped object created using three-dimensional CAD software, three-dimensional CG software, or the like. As the shape data, for example, data in an STL format or an AMF format can be used.

In step S20, the first processing unit 411 generates, according to a predetermined condition, a support structure for supporting the shaped object represented by the shape data. A condition for generating the support structure is designated in advance by a system or a user. This condition includes, for example, a condition of a place where the support structure is generated in the shaped object. As the place where the support structure is generated, for example, an overhang portion or a bridge portion can be designated. The overhang portion refers to a projection portion of the shaped object which is not supported below. The bridge portion refers to a bridge-shaped portion whose both ends are supported. The first processing unit 411 automatically generates, according to the condition instructed by the system or the user, a support structure for supporting the shaped object for the shaped object.

In step S30, the display control unit 412 displays, on the display device 480, a screen representing the shape of the shaped object and a shape of the support structure generated by the first processing unit 411.

Figure 7:
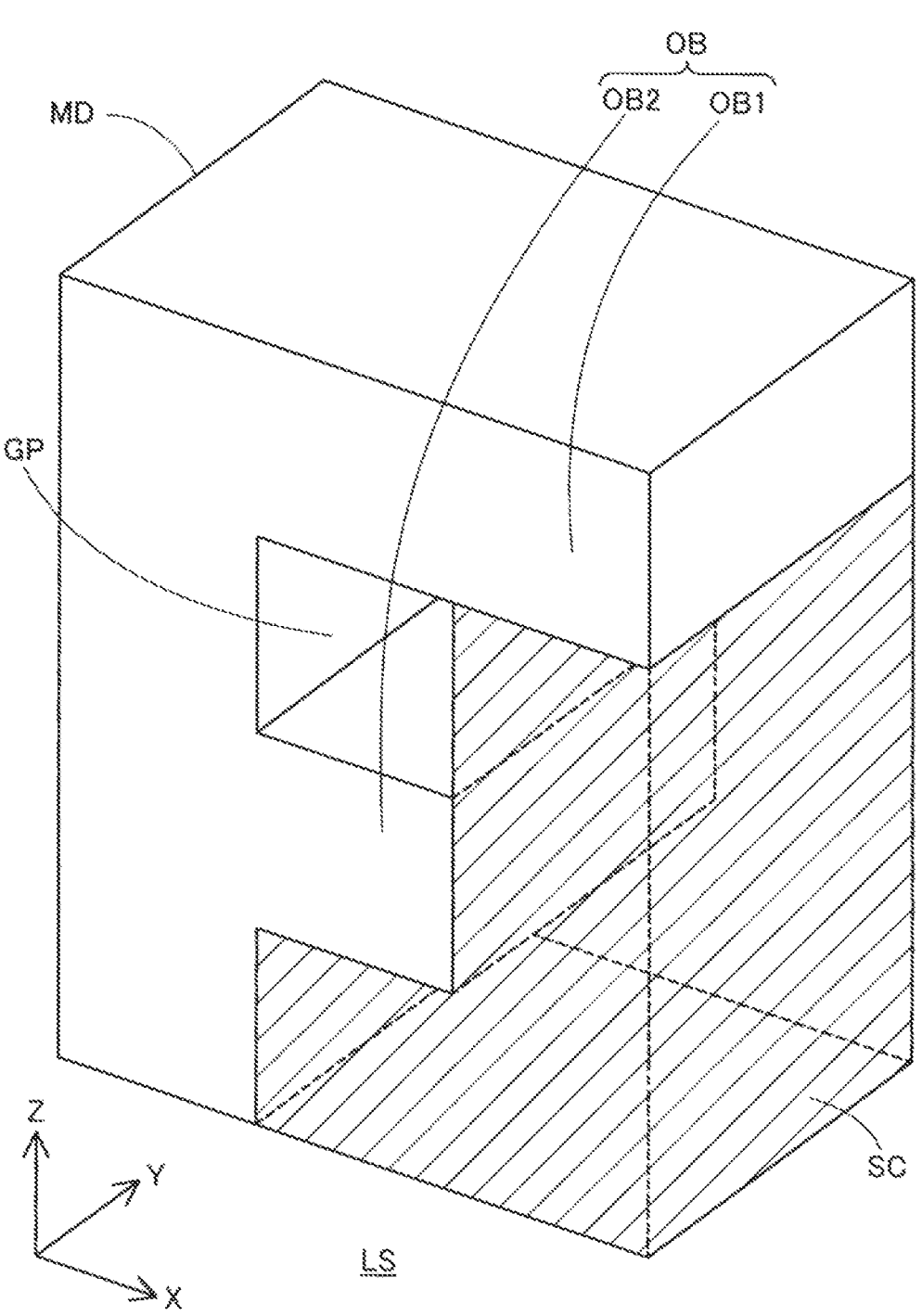
FIG. 7 is a diagram showing a display example of the shaped object and a support structure.

FIG. 7 is a diagram showing a display example of a shaped object MD and a support structure SC. In FIG. 7, a shape of the shaped object representing a letter "F" in the alphabet is displayed as a shape of the shaped object MD. In the embodiment, the display control unit 412 displays the support structure SC in a translucent manner in order to distinguish the support structure SC from other regions. In FIG. 7, a portion corresponding to the support structure SC is hatched. FIG. 7 shows an example in which the support structure SC is automatically generated between an overhang portion OB and a lowermost surface LS corresponding to the shaping surface 211 of the stage 210 according to a predetermined condition. In the example shown in FIG. 7, the support structure SC is not generated in a gap portion GP between two overhang portions OB1 and OB2 in the shaped object MD.

In step S40 of FIG. 6, the reception unit 413 receives removal information indicating a region to be removed from the support structure SC generated by the first processing unit 411. The reception unit 413 receives a region to be removed by a mouse or a keyboard coupled to the information processing device 400. The reception unit 413 may receive not only one piece of removal information but also two or more pieces of removal information. In FIG. 7, the portion indicating the support structure SC displayed by the display control unit 412 in the translucent manner to be distinguished from other regions is also a region in which the support structure SC can be removed.

In step S50, the display control unit 412 displays, on the display device 480, a screen representing the removal information received in step S40.

Figure 8:
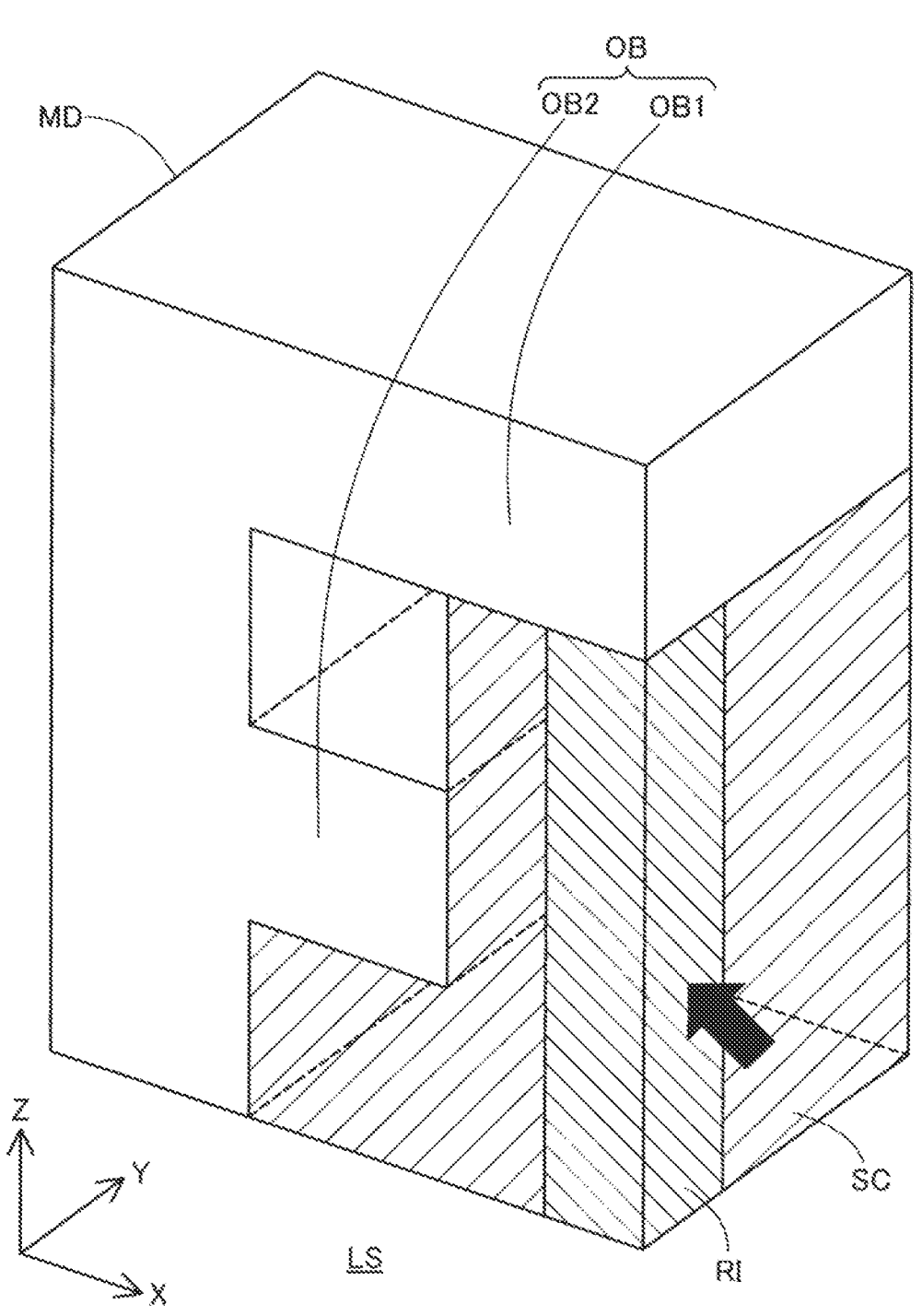
FIG. 8 is a diagram showing a display example of removal information.

FIG. 8 is a diagram showing a display example of removal information RI. As shown in FIG. 8, the display control unit 412 displays a removal range represented by the removal information RI in a columnar shape on the screen. In FIG. 8, the removal information RI is represented by a quadrangular prism shape, but the display control unit 412 may represent the removal information RI by a column or another shape having a certain height. The user can designate any region in the support structure SC as the removal information RI by moving a position of the removal information RI represented by the columnar shape using the mouse or the keyboard. For example, the user can freely change a size of the removal range represented by the removal information RI by dragging a side or a vertex of the columnar shape using the mouse. For example, when the user causes the columnar shape to enter a region where the columnar shape can be disposed from outside of a range of the shaped object MD using a mouse or the like, the display control unit 412 may notify the user that the columnar shape can be disposed at the position by changing a color of the columnar shape.

The display control unit 412 may automatically adjust a height of the columnar shape according to a shape of the shaped object MD at a position where the columnar shape is disposed. In this case, for example, when the overhang portion OB or the bridge portion of the shaped object MD is present at a position where the columnar shape is to be disposed, the display control unit 412 adjusts the height of the columnar shape to a height from the lowermost surface LS to the overhang portion OB or the bridge portion.

The display control unit 412 displays the support structure SC generated by the first processing unit 411 and the removal information RI in a distinguishable manner. In the embodiment, the display control unit 412 displays the support structure SC with a higher degree of transparency than the removal information RI, thereby displaying the support structure SC and the removal information RI in a distinguishable manner. For example, the display control unit 412 displays the removal information RI in a non-transparent color different from that of the shaped object MD, and displays the support structure SC in a transparent color. The display control unit 412 may display the support structure SC and the removal information RI in different colors or different patterns.

In step S60 of FIG. 6, the second processing unit 414 generates shaping data. The shaping data includes main body data for shaping the shaped object MD and support data for shaping the support structure.

In generating the main body data, the second processing unit 414 analyzes the shape data acquired in step S10 and slices the shape of the shaped object MD into a plurality of layers along an XY plane. Then, the second processing unit 414 generates movement path information representing a movement path of the nozzle 61 for forming an outer shell of each layer and filling an inner region with a predetermined filling rate or filling pattern. The movement path information includes data representing a plurality of linear movement paths. Each movement path in the movement path information includes discharge amount information indicating a discharge amount of the shaping material discharged in the movement path. The second processing unit 414 generates the movement path information and the discharge amount information for all the layers of the shaped object MD to generate the main body data. The main body data is represented by, for example, a G code.

In generating the support data, the second processing unit 414 slices, for a portion of the support structure SC generated in step S20 excluding a portion corresponding to the removal information RI received in step S40, a shape of the support structure SC into a plurality of layers along the XY plane. Then, the second processing unit 414 generates movement path information representing a movement path of the nozzle 61 for forming an outer shell of each layer and filling an inner region with a predetermined filling rate or filling pattern. The movement path information includes data representing a plurality of linear movement paths. Each movement path in the movement path information includes discharge amount information indicating a discharge amount of the shaping material discharged in the movement path. The second processing unit 414 generates the movement path information and the discharge amount information for all layers of the support structure SC to generate the support data. The support data is represented by, for example, a G code, similar to the main body data.

Figure 9:
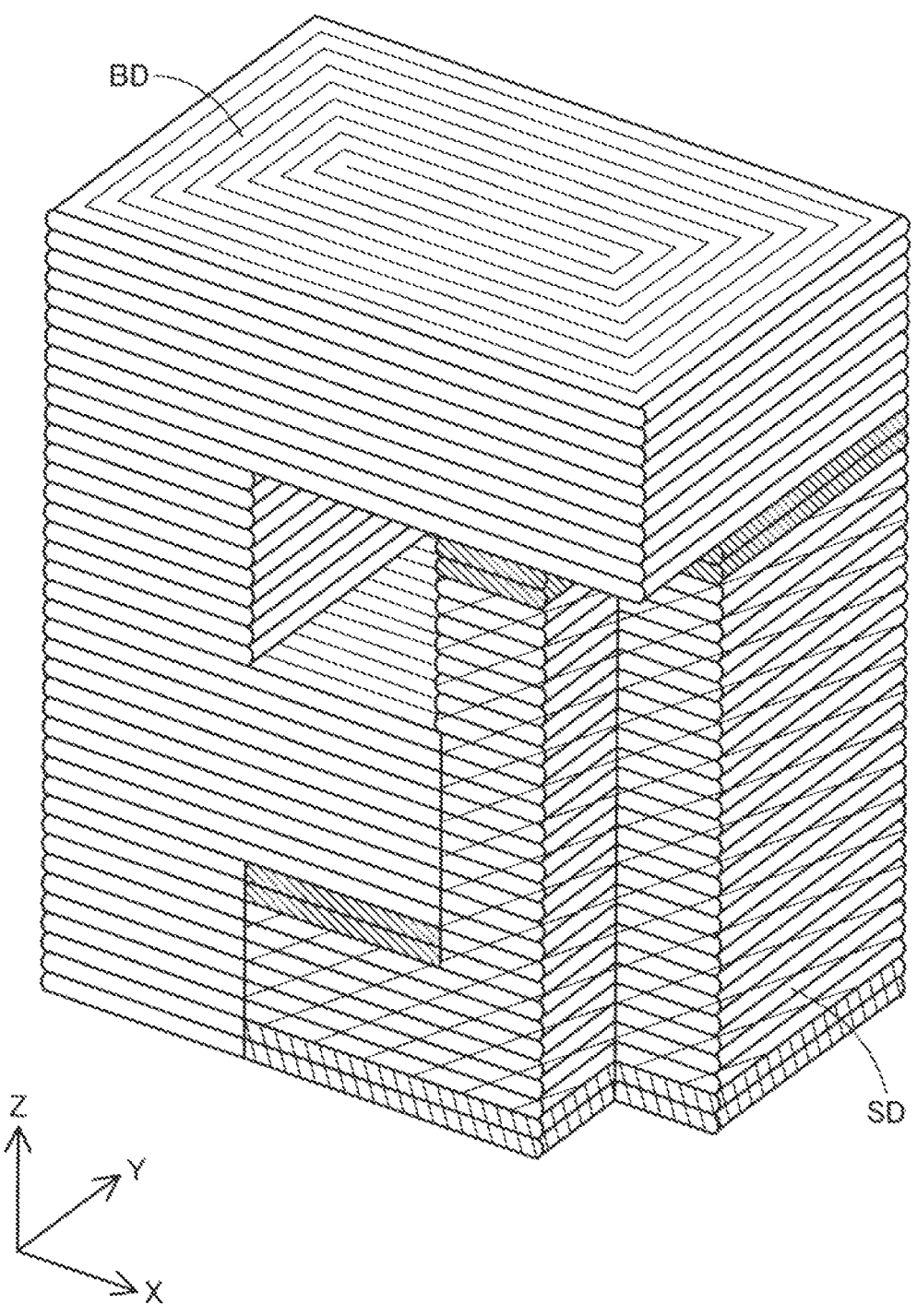
FIG. 9 is a diagram showing a display example of shaping data generated by a second processing unit.

FIG. 9 is a diagram showing a display example in which the shaping data generated by the second processing unit 414 is visualized. As shown in FIG. 9, the shaping data includes main body data BD for shaping a shaped object and support data SD for shaping a support structure. In the support structure SC, no support data SD is generated in a portion removed by the removal information RI, and the portion is cut out.

The CPU 410 of the information processing device 400 transmits, to the control unit 300 of the three-dimensional shaping device 100, the shaping data generated by the shaping data generation processing described above. The control unit 300 shapes, according to the shaping data acquired from the information processing device 400, the shaped object MD and the support structure SC on the shaping surface 211 of the stage 210 by controlling the discharge portion 60 and the movement mechanism 230.

According to the information processing device 400 of the embodiment described above, even when the support structure SC is generated in an unnecessary portion as a result of the support structure SC for supporting the shaped object MD being automatically generated according to a predetermined condition, the support structure SC in the portion can be removed later by the user. Therefore, an appropriate support structure SC can be disposed for the shaped object MD, and shaping accuracy of the shaped object MD can be improved.

In the embodiment, since the removal information RI for removing a part of the support structure SC is displayed on the screen in a columnar shape, the user can easily recognize the removal information RI.

In the embodiment, since the support structure SC generated by the first processing unit 411 and the removal information RI are displayed in a distinguishable manner, it is easy to recognize a position of the removal information RI in the support structure SC. In particular, in the embodiment, since the support structure SC generated by the first processing unit 411 is displayed with higher transparency than the removal information RI, the position of the removal information RI in the support structure SC is more easily recognized.

In the embodiment, since a removable region in the support structure SC is displayed to be distinguishable from other regions, the user can easily designate the removal information RI.

B. Second Embodiment

In the above first embodiment, in the support structure SC generated by the first processing unit 411, the region designated by the removal information RI is removed from the support structure SC. In contrast, in the second embodiment, not only a part of the support structure SC can be removed by the removal information RI, but also a region to be newly added to the support structure SC generated by the first processing unit 411 is received, and the support structure SC is expanded or increased.

FIG. 10 is a flowchart of shaping data generation processing executed by the information processing device 400 according to the second embodiment. In FIG. 10, steps having the same processing content as the shaping data generation processing according to the first embodiment shown in FIG. 6 are denoted by the same step numbers.

In step S10, the first processing unit 411 of the information processing device 400 acquires shape data representing a three-dimensional shape of the shaped object MD.

In step S20, the first processing unit 411 generates, according to a predetermined condition, the support structure SC for supporting the shaped object MD represented by the shape data.

In step S30, the display control unit 412 displays, on the display device 480, a screen representing a shape of the shaped object MD and a shape of the support structure SC generated by the first processing unit 411.

In step S40*b*, the reception unit 413 receives the removal information RI and receives additional information indicating a region to be newly added to the support structure SC generated by the first processing unit 411. The reception unit 413 receives additional information for adding a region by a mouse or a keyboard coupled to the information processing device 400, similar to the removal information RI. The reception unit 413 may receive not only one piece of additional information but also two or more pieces of additional information. The reception unit 413 may receive the additional information together with the removal information RI or only the additional information.

In step S50*b*, the display control unit 412 displays, on the display device 480, a screen representing the additional information received by the reception unit 413 together with the removal information RI.

Figure 11:
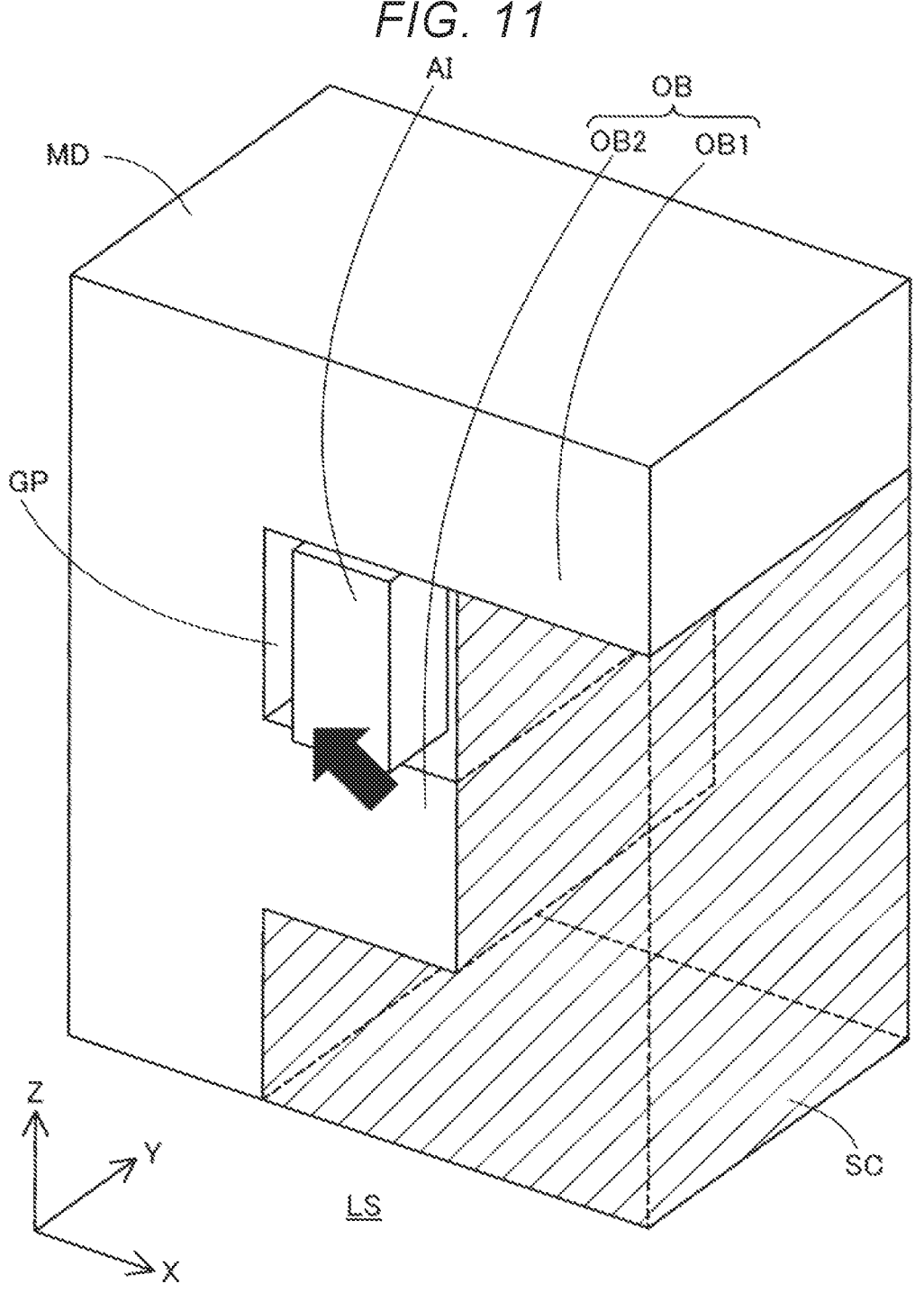
FIG. 11 is a diagram showing a display example of additional information.

FIG. 11 is a diagram showing a display example of additional information AI. FIG. 11 shows the additional information AI for adding the support structure SC to the gap portion GP of the shaped object MD. As shown in FIG. 11, the display control unit 412 displays an additional range represented by the additional information AI in a columnar shape on the screen. In FIG. 11, the additional information AI is displayed by a quadrangular prism shape, but the display control unit 412 may represent the additional information AI by a column or another shape having a certain height. The user can move a position of the additional information AI represented by the columnar shape using the mouse or the keyboard. The user can freely change a size of the additional range represented by the additional information AI by dragging a side or a vertex of the columnar shape using the mouse.

The display control unit 412 may automatically adjust a height of the columnar shape according to a shape of the shaped object MD at a position where the columnar shape is disposed. For example, when a position where the columnar shape is to be disposed is the gap portion GP of the shaped object MD, the display control unit 412 causes a height of the columnar shape to match a length of a gap in the Z direction. When the columnar shape is to be disposed below the overhang portion OB or the bridge portion of the shaped object MD, the display control unit 412 adjusts the height of the columnar shape to a height from the lowermost surface LS to the overhang portion OB or the bridge portion.

The display control unit 412 displays the support structure SC generated by the first processing unit 411 and the additional information AI in a distinguishable manner. In the embodiment, the display control unit 412 displays the support structure SC with a higher degree of transparency than the additional information AI, thereby displaying the support structure SC and the additional information AI in a distinguishable manner. For example, the display control unit 412 displays the additional information AI in a non-transparent color different from that of the shaped object MD, and displays the support structure SC in a transparent color. The display control unit 412 may display the support structure SC and the additional information AI in different colors or different patterns.

The display control unit 412 may display a region in which the additional information AI can be added to the support structure SC so as to be distinguishable from other regions. For example, the display control unit 412 displays, in a blinking manner, the gap portion GP in which the support structure SC is not generated by the first processing unit 411 in the shaped object MD. In this way, the user can easily designate a region to which the support structure SC can be added. When the support structure SC is allowed to project from the shaped object MD in the X direction or the Y direction, the display control unit 412 may display a maximum region where the support structure SC can be generated so as to be distinguishable from other regions.

In step S60, the second processing unit 414 generates shaping data including the main body data and the support data. In step S60, the second processing unit 414 generates support data for shaping a new support structure SC in which the removal information RI and the additional information AI are reflected in the support structure SC generated by the first processing unit 411.

Figure 12:
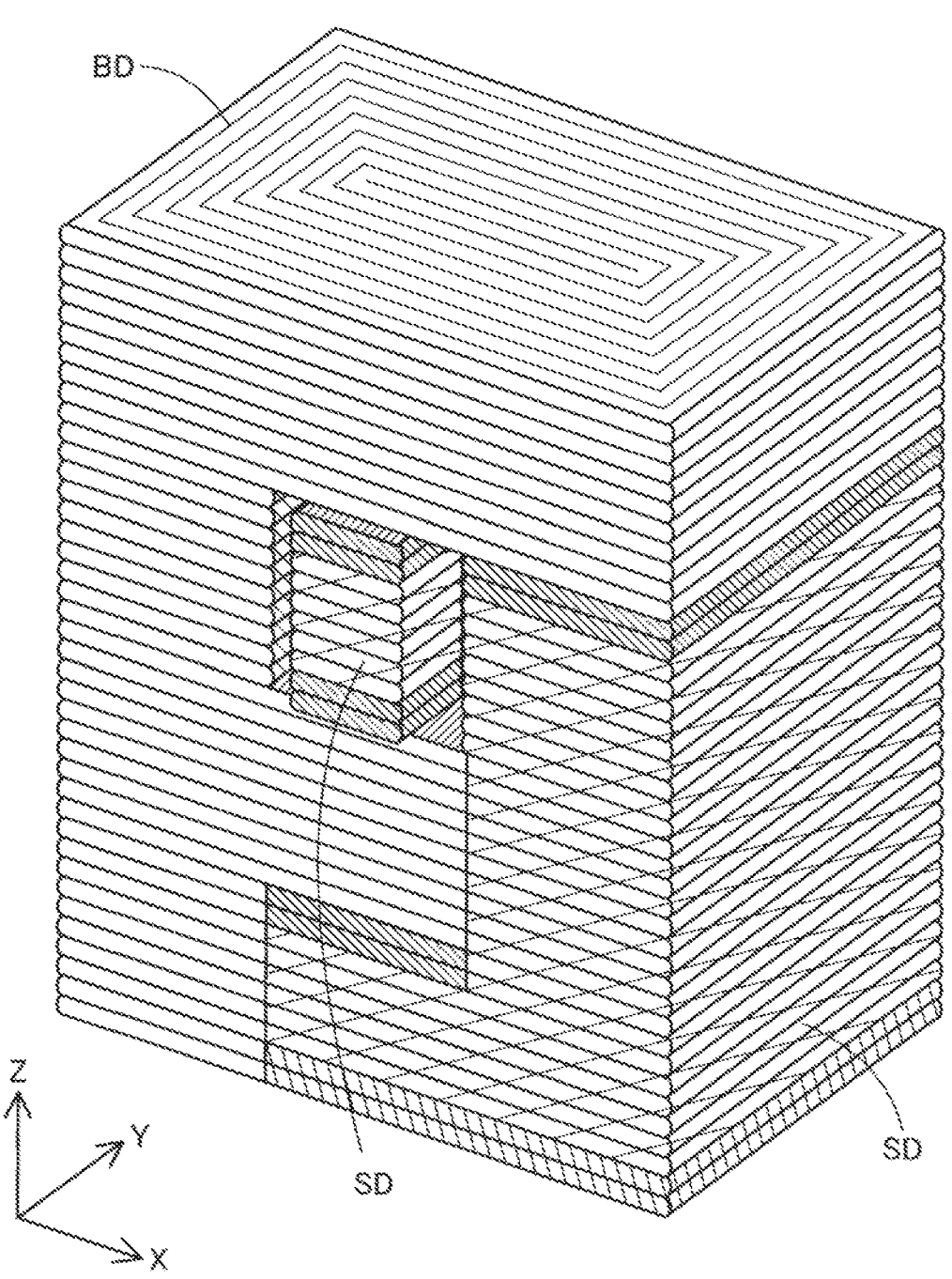
FIG. 12 is a diagram showing a display example of shaping data generated by the second processing unit.

FIG. 12 is a diagram showing a display example of shaping data generated by the second processing unit 414. FIG. 12 shows an example in which only the additional information AI is reflected in the support structure SC. By reflecting the additional information AI in the support structure SC, it is possible to appropriately add the support structure SC to the gap portion GP or the like of the shaped object MD.

In the embodiment, when the second processing unit 414 generates the shaping data in step S60, and when at least a part of a region designated by the removal information RI and a region designated by the additional information AI overlap, the second processing unit 414 generates the support data SD based on information of the removal information RI and the additional information AI received later by the reception unit 413 in step S40*b*.

Figure 13:
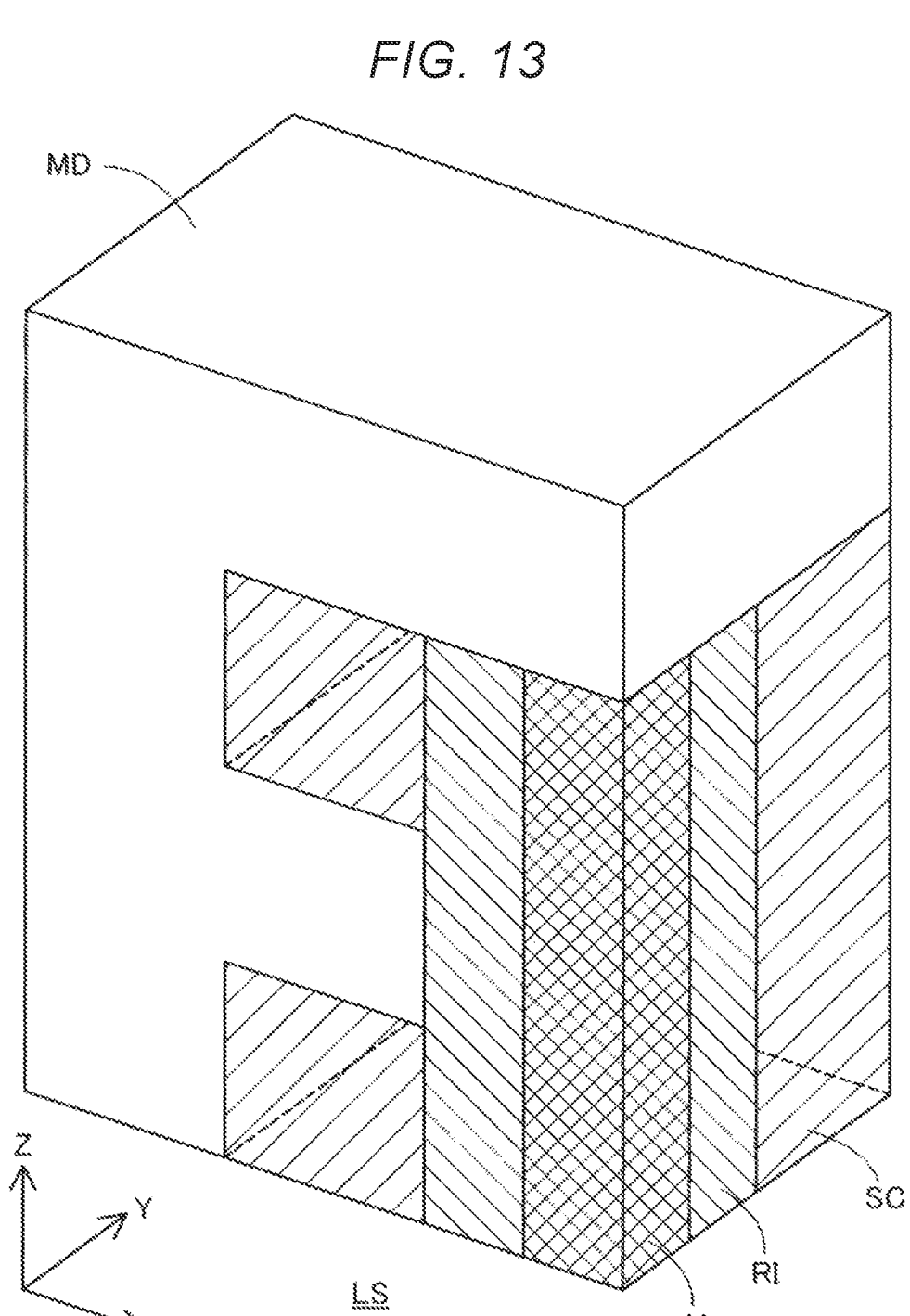
FIG. 13 is a diagram showing a display example of the support structure when the removal information and the additional information overlap.

FIG. 13 is a diagram showing a display example of the support structure SC when the removal information RI and the additional information AI overlap. FIG. 13 shows an example in which the reception unit 413 first receives the removal information RI and then receives the additional information AI. In FIG. 13, an overlapping portion between a region designated by the removal information RI and a region designated by the additional information AI is indicated by cross-hatching. The overlapping portion indicated by the cross-hatching matches the region of the additional information AI.

Figure 14:
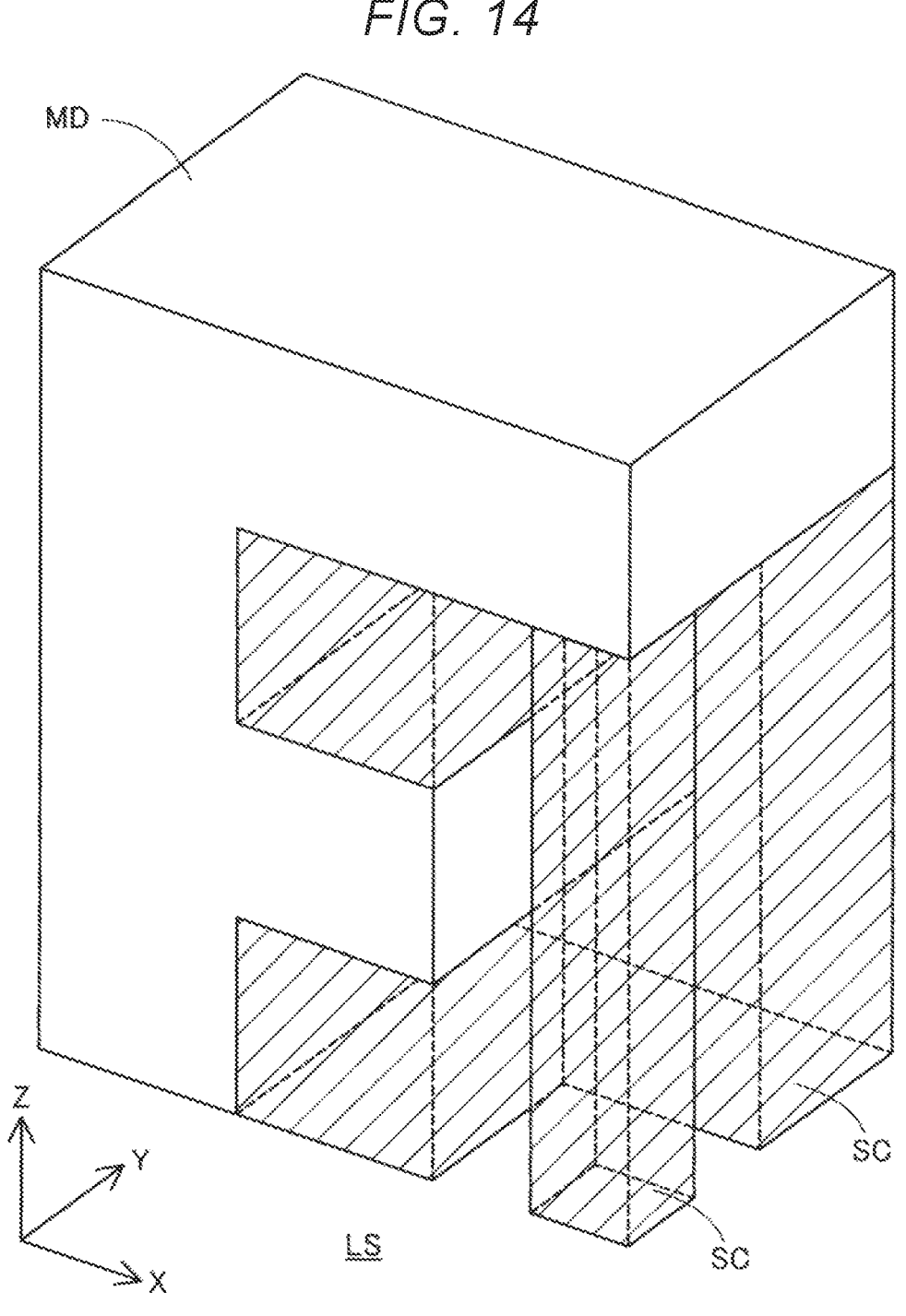
FIG. 14 is a diagram showing a display example of the updated support structure.

FIG. 14 is a diagram showing a display example of the updated support structure SC. When the user performs a predetermined update operation in a state where the removal information RI and the additional information AI are displayed as shown in FIG. 13, the display control unit 412 displays the updated support structure SC reflecting the removal information RI and the additional information AI on the screen as shown in FIG. 14. In the example shown in FIG. 14, a new support structure SC in which the additional information AI is added is generated in the support structure SC in which the removal information RI is removed. The second processing unit 414 can generate, by generating the support data SD based on the support structure SC thus updated, the support data SD based on the information of the removal information RI and the additional information AI received later by the reception unit 413.

According to the second embodiment described above, not only an unnecessary portion can be removed from the support structure SC automatically generated by the first processing unit 411, but also the support structure SC can be added for a necessary portion. Therefore, an appropriate support structure SC can be disposed for the shaped object MD, and shaping accuracy of the shaped object MD can be improved.

In the second embodiment, when at least a part of the region designated by the removal information RI and the region designated by the additional information AI overlap, the support data SD is generated based on information received later by the reception unit 413, that is, information instructed later by the user, of the removal information RI and the additional information AI. Therefore, an intention of the user is easily reflected in the shape of the support structure SC.

C. Other Embodiments (C1) Although the three-dimensional shaping device 100 according to the above embodiment includes one shaping part 110, the three-dimensional shaping device 100 may include two shaping parts 110. In this case, a shaping material for shaping the shaped object MD is discharged from one shaping part 110, and a support material for shaping the support structure SC is discharged from the other shaping part 110. In this way, it is possible to perform shaping by using different materials for the shaped object MD and the support structure SC.

(C2) In the above embodiment, the display control unit 412 may display the shaped object MD, the support structure SC, the removal information RI, and the additional information AI on not only the display device 480 coupled to the information processing device 400 but also another device coupled, via a network, to the information processing device 400.

(C3) In the above embodiment, the shaping part 110 plasticizes a material by the flat screw 40. In contrast, the shaping part 110 may plasticize a material by, for example, rotating an inline screw. The shaping part 110 may plasticize a filament-shaped material with a heater.

(C4) In the above embodiment, a material extrusion method in which plasticized materials are stacked is described as an example, but various methods such as an ink-jet method, a direct metal deposition (DMD) method, and a binder jet method can be applied.

D. Other Aspects

The present disclosure is not limited to the embodiments described above, and may be implemented by various configurations without departing from the gist of the present disclosure. For example, technical characteristics of the embodiments corresponding to technical characteristics of the aspects described below can be appropriately replaced or combined in order to solve a part or all of the above problems or to achieve a part or all of the above effects. If the technical characteristics are not described as essential in the specification, the technical characteristics can be deleted as appropriate.

(1) According to a first aspect of the present disclosure, an information processing device is provided. The information processing device includes: a first processing unit configured to generate, according to a predetermined condition, a support structure for supporting a shaped object shaped by a three-dimensional shaping device; a display control unit configured to display, on a screen, a shape of the shaped object and a shape of the support structure generated by the first processing unit; a reception unit configured to receive removal information indicating a region to be removed from the support structure generated by the first processing unit; and a second processing unit configured to generate, based on the support structure generated by the first processing unit and the removal information received by the reception unit, support data for shaping the support structure by the three-dimensional shaping device.

According to such an aspect, it is possible to improve shaping accuracy of the shaped object since an appropriate support structure can be disposed for the shaped object.

(2) In the above aspect, the display control unit may display the removal information in a columnar shape on the screen. According to such an aspect, it is easy to recognize the removal information.

(3) In the above aspect, the display control unit may display the support structure generated by the first processing unit and the removal information in a distinguishable manner. According to such an aspect, it is easy to recognize a position of the removal information in the support structure.

(4) In the above aspect, the display control unit may display the support structure generated by the first processing unit with a higher degree of transparency than the removal information. According to such an aspect, it is easy to recognize a position of the removal information in the support structure.

(5) In the above aspect, the reception unit may receive a region to be added to the support structure generated by the first processing unit, and the second processing unit may generate, when at least a part of a region designated by the removal information and a region designated by the additional information overlap, the support data based on information of the removal information and the additional information later received by the reception unit. According to such an aspect, an intention of the user is easily reflected in the shape of the support structure.

(6) In the above aspect, the display control unit may display a removable region in the support structure to be distinguishable from other regions. According to such an aspect, the removal information can be easily designated.

(7) In the above aspect, the reception unit may receive a region to be added to the support structure generated by the first processing unit, and the display control unit may display a region which can be added to the support structure to be distinguishable from other regions. According to such an aspect, it is possible to easily designate a region which can be added to the support structure.

The present disclosure is not limited to the information processing device described above, and can be implemented by various aspects such as a three-dimensional shaping system, a computer program, and a non-transitory tangible recording medium in which a computer program is recorded in a computer-readable manner.

What is claimed is:

1. An information processing device comprising:
a communication interface configured to communicate with an external controller;
a memory configured to store a program; and
a processor configured to execute the program so as to:
  receive shaping data of a three-dimensional object shaped by a three-dimensional shaping device on a shaping surface, the shaping data including main body data representing a main body of the three-dimensional object and support data representing a support structure to support the main body;
  generate, according to a predetermined condition, a first virtual model of the three-dimensional object, the first virtual model representing the main body and the support structure based on the shaping data;
  display the first virtual model on a screen of a display;
  receive removal information indicating a removal region to be removed from the support structure via the communication interface;
  generate, based on the shaping data and the removal, a second virtual model showing the main body, the support structure, and the removal region, the second virtual model including a plurality of layer structures corresponding to the main body and the support structure;
  display the second virtual model on the screen of the display;
  create updated shaping data corresponding to the second virtual model; and
  transmit the updated shaping date to the external controller via the communication interface such that the external controller is configured to cause the three-dimensional shaping device to form the three-dimensional object based on the updated shaping date,
wherein the removal region is in a columnar shape, and the removal region elongates from the shaping surface to a bottom of an overhang portion of the main body along a vertical direction.

2. The information processing device according to claim 1, wherein
the processor is further configured to display the removal information in the columnar shape on the screen of the display.

3. The information processing device according to claim 1, wherein
the processor is further configured to display the support structure and the removal information in a distinguishable manner on the screen of the display.

4. The information processing device according to claim 3, wherein
the processor is further configured to display the support structure with a higher degree of transparency than the removal information on the screen of the display.

5. The information processing device according to claim 1, wherein
the processor is further configured to receive additional information indicating a region to be added to the support structure, and
the processor is further configured to receive, when at least a part of a region designated by the removal information and a region designated by the additional information overlap, the support data based on information of the removal information and the additional information via the communication interface.

6. The information processing device according to claim 1, wherein
the processor is further configured to display the removal region in the support structure to be distinguishable from other regions on the screen of the display.

7. The information processing device according to claim 1, wherein
the processor is further configured to receive additional information indicating a region to be added to the support structure, and
the processor is further configured to display a region which can be added to the support structure to be distinguishable from other regions on the screen of the display.

* * * * *